United States Patent
Matsuo et al.

(10) Patent No.: US 10,616,435 B2
(45) Date of Patent: Apr. 7, 2020

(54) ELECTRONIC APPARATUS, IMAGE FORMING APPARATUS, AND RECORDING MEDIUM

(71) Applicant: KONICA MINOLTA, INC., Chiyoda-ku, Tokyo (JP)

(72) Inventors: Nobuhiro Matsuo, Toyokawa (JP); Takeshi Nomura, Toyohashi (JP); Yoshiki Nakazawa, Toyokawa (JP); Toshinori Inomoto, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/262,175

(22) Filed: Jan. 30, 2019

(65) Prior Publication Data

US 2019/0260899 A1  Aug. 22, 2019

(30) Foreign Application Priority Data

Feb. 20, 2018  (JP) .................................. 2018-27496

(51) Int. Cl.
*H04N 1/00* (2006.01)
*G06F 3/12* (2006.01)

(52) U.S. Cl.
CPC ......... *H04N 1/00994* (2013.01); *G06F 3/121* (2013.01); *G06F 3/1231* (2013.01); *H04N 1/00034* (2013.01); *H04N 1/00063* (2013.01); *H04N 1/00087* (2013.01); *H04N 1/00323* (2013.01)

(58) Field of Classification Search
CPC .......... H04N 1/00994; H04N 1/00323; H04N 1/00063; H04N 1/00087; H04N 1/00034; G06F 3/121; G06F 3/1231
USPC ....................................................... 358/1.13
See application file for complete search history.

(56) References Cited

U.S. PATENT DOCUMENTS

2016/0098234 A1*  4/2016  Weaver ................. G06F 3/1234
                                                          358/1.15

FOREIGN PATENT DOCUMENTS

| JP | 10117379 A | 5/1998 |
| JP | 2002112450 A | 4/2002 |
| JP | 2003123165 A | 4/2003 |

* cited by examiner

*Primary Examiner* — Saeid Ebrahimi Dehkordy
(74) *Attorney, Agent, or Firm* — Buchanan Ingersoll & Rooney PC (57) ABSTRACT

An electronic apparatus includes a processor that performs: obtaining first information related to ambient electromagnetic radiation of the electronic apparatus in an environment having at least one other electronic apparatus; and controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained by the processor.

25 Claims, 9 Drawing Sheets

| Name of Motor | Motor A | Motor B | Motor C |
|---|---|---|---|
| Name of Motor by Role | Process Motor | Scan Motor | ADF Motor |
| Assigned processes | Printing<br>Copying from ADF<br>Fax receiving<br>Fax transmission | Scanning | Copying from ADF<br>Fax transmission |
| Assigned Bandwidth | 30MHz~300MHz | 300MHz~600MHz | 600MHz~1GHz |
| Allowable Level of Electromagnetic Radiation Exposure | First Threshold | Second Threshold | Third Threshold |

ELECTRONIC APPARATUS, IMAGE FORMING APPARATUS, AND RECORDING MEDIUM

The disclosure of Japanese Patent Application No. 2018-027496 filed on Feb. 20, 2018, including description, claims, drawings, and abstract, is incorporated herein by reference in its entirety.

BACKGROUND

Technological Field

The present invention relates to: an electronic apparatus that is capable of preventing risk of malfunction and other problems due to ambient electromagnetic radiation of the electronic apparatus itself; an image forming apparatus; and a recording medium.

Description of the Related Art

Usually, the electromagnetic compatibility (EMC) of an electronic apparatus e.g. an image forming apparatus such as a copier, printer, and facsimile is determined by immunity and emission. Immunity is the susceptibility of an electronic apparatus to unwanted electromagnetic radiation (allowable limit of electromagnetic radiation exposure); emission refers to the generation of unwanted electromagnetic radiation by an electronic apparatus (limit of unwanted electromagnetic radiation). Regulating emission with respect to immunity allows multiple electronic apparatuses to work properly in one environment.

With the progress of technology as seen in internet of things (IoT) and robots, it is not surprising that, in the near future, more and more electronic apparatuses will work in one environment and these electronic apparatuses may be sometimes relocated. That is, many electronic apparatuses will work in one environment, being exposed to high-power ambient electromagnetic radiation.

All electronic apparatuses in one environment are supposed to comply with their limits of electromagnetic radiation emission. However, many electronic apparatuses in one environment will be exposed to electromagnetic radiation they emit from each other, having risk of malfunction due to an excess of ambient electromagnetic radiation with respect to their immunities. In other words, when they work without controlling their own operations, they will have risk of malfunction due to an excess of ambient electromagnetic radiation with respect to their immunities.

Japanese Unexamined Patent Application Publication No. 2003-123165 discloses a technique of: detecting a harmful level of radio or electromagnetic radiation in an environment where electronic apparatuses work; and giving a sound of warning, a voice of warning, or a visual warning.

Japanese Unexamined Patent Application Publication No. 2002-112450 discloses a technique of: detecting, using a sensor circuit, a certain level or above of electromagnetic radiation exposure or a certain condition of electromagnetic radiation exposure that can cause malfunction or failure to an electronic apparatus; transmitting a start signal to a processor circuit for reducing electromagnetic radiation exposure; and running the processor circuit during exposure to electromagnetic radiation or until complete shutdown of the electronic apparatus.

Japanese Unexamined Patent Application Publication No. H10-117379 discloses a technique of allowing a portable terminal to detect electromagnetic radiation leaked from an apparatus, judge whether or not electromagnetic radiation having the same frequency range as the detected electromagnetic radiation can cause malfunction to other apparatuses, and give a warning if it can cause malfunction.

In Japanese Unexamined Patent Application Publications No. 2003-123165, a sound of warning, a voice of warning, or a visual warning is given upon detecting a harmful level of electromagnetic radiation. In Japanese Unexamined Patent Application Publication No. H10-117379, a warning is given upon detecting electromagnetic radiation having a frequency range that can cause malfunction to other apparatuses. In both techniques, the user has to manually deal with risk of malfunction and other problems in response to the warning, and the electronic apparatus is not capable of mechanically preventing the risk.

In Japanese Unexamined Patent Application Publication No. 2002-112450, the processor circuit for reducing electromagnetic radiation exposure must be a dedicated one, making the configuration intricate.

SUMMARY

The present invention, which has been made in consideration of such a technical background as described above, is capable of preventing risk of malfunction and other problems due to ambient electromagnetic radiation, while not requiring a dedicated processor circuit for reducing electromagnetic radiation exposure or any intricate configuration.

A first aspect of the present invention relates to an electronic apparatus including a processor that performs:

obtaining first information related to ambient electromagnetic radiation of the electronic apparatus in an environment having at least one other electronic apparatus; and controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained by the processor.

A second aspect of the present invention relates to an image forming apparatus including a processor that performs:

obtaining first information related to ambient electromagnetic radiation of the image forming apparatus in an environment having at least one other electronic apparatus; and controlling operation of either one or both of the image forming apparatus and the at least one other electronic apparatus with reference to the result of the comparison of a level of ambient electromagnetic radiation of the image forming apparatus to an allowable limit of electromagnetic radiation exposure of the image forming apparatus, the level of ambient electromagnetic radiation being included in the first information obtained by the processor.

A third aspect of the present invention relates to a non-transitory computer-readable recording medium storing a program for a computer of an electronic apparatus, the program to make the computer execute:

obtaining first information related to ambient electromagnetic radiation of the electronic apparatus being in an environment having at least one other electronic apparatus; and controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
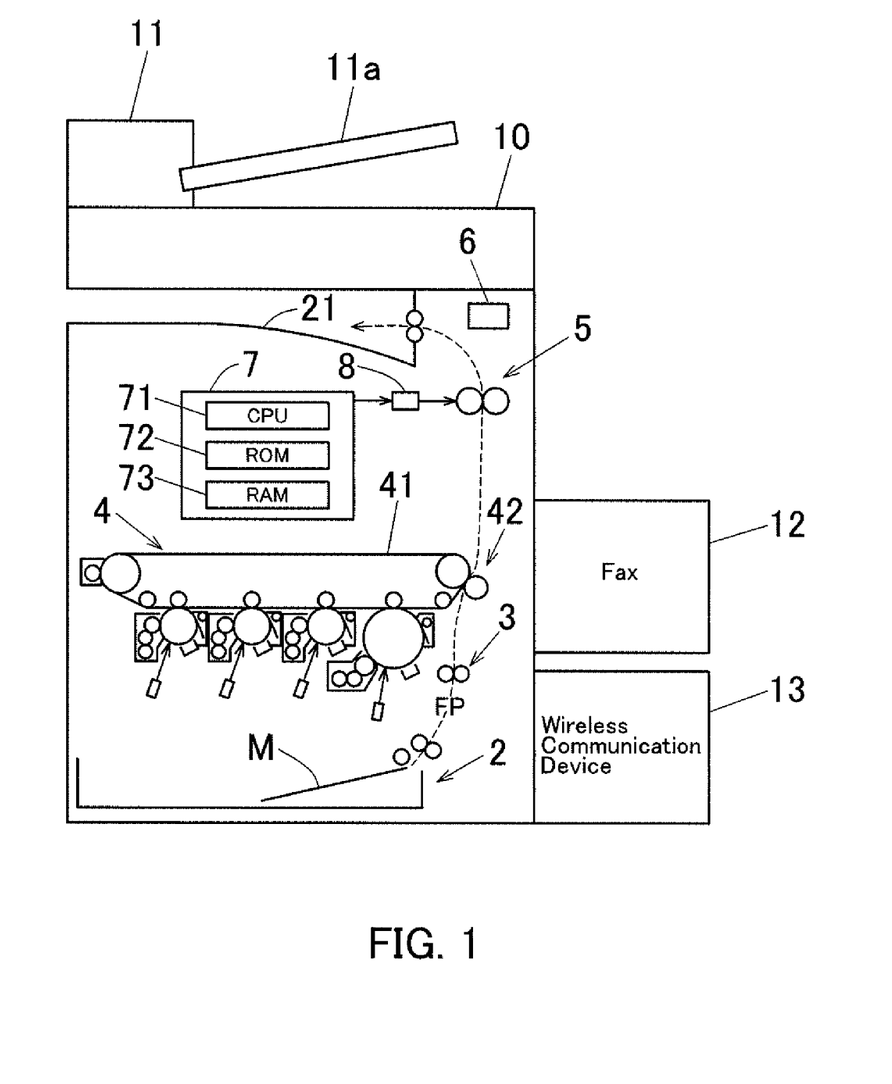
FIG. 1 illustrates a configuration of an image forming apparatus as an electronic apparatus according to one embodiment of the present invention.

FIG. 1 illustrates a configuration of an image forming apparatus 1 as an electronic apparatus according to one embodiment of the present invention.

The image forming apparatus 1 is a copier, a printer, a facsimile (also to be referred to as "fax"), or a multifunctional machine having the foregoing functions, for example. The image forming apparatus 1 prints an image on a sheet-like print medium M (print paper, for example). In this embodiment, the image forming apparatus 1 is a multifunctional machine as an example. The image forming apparatus 1 is essentially provided with a paper feeder 2, a pair of resist rollers 3, an imaging device 4, a fuser 5, an operation and input portion 6, a processor 7, and a power supply 8.

Print mediums M are loaded on the paper feeder 2. The paper feeder 2 transfers print mediums M one by one to a conveyor path FP indicated by a dashed line in FIG. 1. The pair of resist rollers 3 is disposed on the conveyor path FP in the lower reaches of the paper feeder 2. The pair of resist rollers 3 briefly stops moving to stop a print medium M received from the paper feeder 2 then starts moving again to direct it to a second transfer area 42 at a predetermined timing.

The imaging device 4 forms toner images on an intermediate transfer belt 41 by a well-known print method, a tandem electro-photographic method. The intermediate transfer belt 41 carries the toner images to the second transfer area 42, While the print medium M arrives at the second transfer area 42 from the pair of paper stop rollers 3, the toner images on the intermediate transfer belt 41 arrive at the second transfer area 42 from the imaging device 4. At the second transfer area 42, the toner images are transferred onto the print medium M from the intermediate transfer belt 41.

The print medium M carrying the toner images is conveyed to the fuser 5, and the fuser 5 firmly sticks the toner images on the print medium M with heat and pressure. The print medium M is then conveyed to a paper output tray 21. The operation and input portion 6 includes numeric keys and a touch-screen panel. The user is allowed to input various kinds of information by manipulating the operation and input portion 6.

The processor 7 is provided with a CPU 71, a ROM 72, and a RAM 73. The CPU 71 executes programs stored on the ROM 72 using the RAM 73 as a workspace. The processor 7 implements each function of the image forming apparatus 1. Specifically, in this embodiment, the processor 7 controls operation of the image forming apparatus 1 and another electronic apparatus with reference to the level of ambient electromagnetic radiation of the image forming apparatus 1, which will be later described in detail.

The image forming apparatus 1 is further provided with: a scanner 10 that reads a document image; an automatic document feeder (ADF) 11 that mechanically reads a series of document images while mechanically feeding sheets of paper set on a document cover paper tray 11a; a fax 12 that sends and receives data via a fax line; and a wireless communication device 13 that sends and receives data externally.

Figure 2:
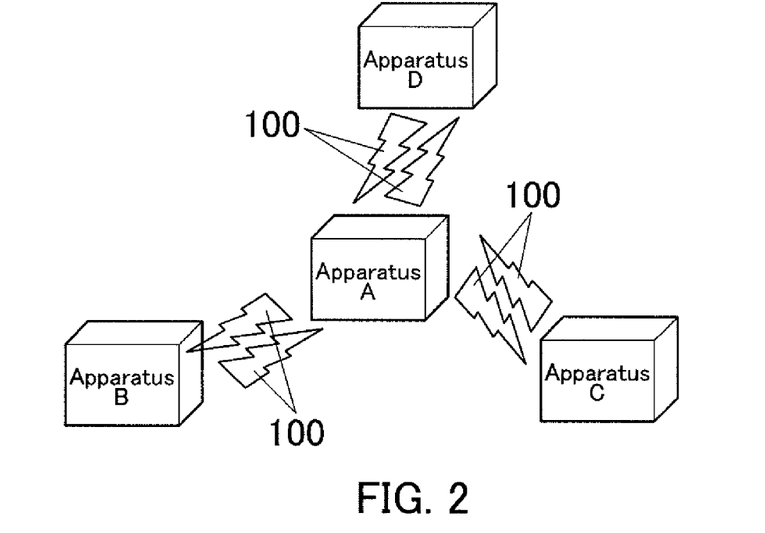
FIG. 2 illustrates an environment having multiple electronic apparatuses (devices) that emit electromagnetic radiation during operation.

FIG. 2 illustrates apparatuses (devices) A, B, C, and D in one environment, which emit electromagnetic radiation 100 during operation. When multiple electronic apparatuses in one environment work without controlling their own operations as shown in this figure, they are exposed to electromagnetic radiation they emit from each other. Although they are all supposed to comply with their limits of unwanted electromagnetic radiation they emit, they have risk of malfunction due to an excess of ambient electromagnetic radiation with respect to their allowable limits of electromagnetic radiation exposure. Ambient electromagnetic radiation of an electronic apparatus depends on the distance from the other electronic apparatuses, the process, and environmental conditions (material and thickness of the wall, for example).

Figure 3:
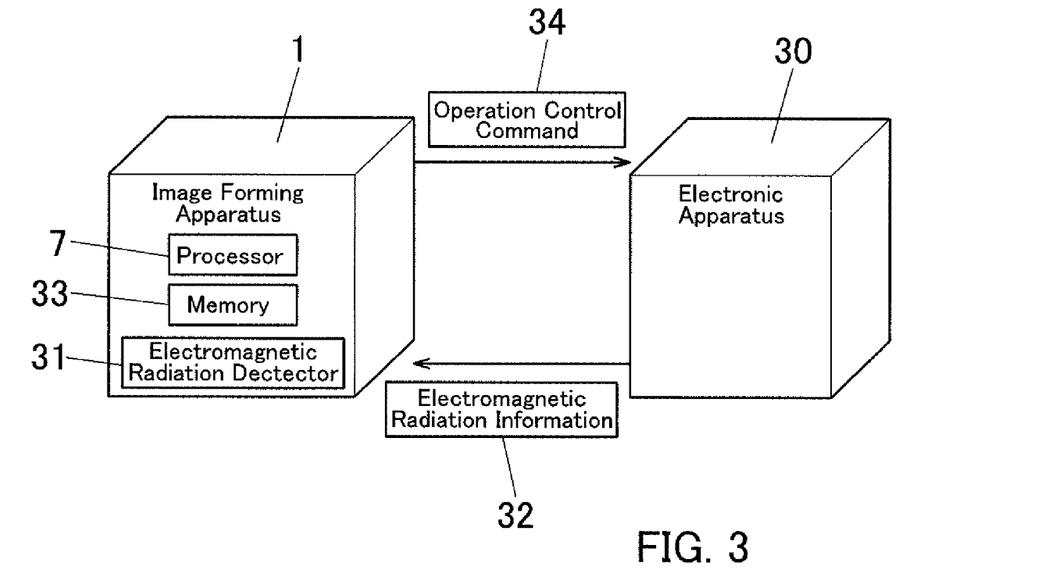
FIG. 3 illustrates the image forming apparatus and another electronic apparatus in one environment, for reference in describing that the image forming apparatus controls operation of the electronic apparatus.

FIG. 3 illustrating the image forming apparatus 1 and an electronic apparatus 30 in one environment, for reference in describing that the image forming apparatus 1 controls operation of the electronic apparatus 30. Any electronic apparatus that emits electromagnetic radiation during operation can be employed as the electronic apparatus 30. The electronic apparatus 30 may be a copier, a printer, a facsimile, or another image forming apparatus 1 having the foregoing functions, for example. Alternatively, the electronic apparatus 30 may be a paper shredder, a refrigerator, an air conditioner, a fluorescent lamp, or another electronic apparatus having a motor or switch-mode power supply, for example.

The image forming apparatus 1 is also provided with a memory 33 and an electromagnetic radiation detector 31 as well as the processor 7. The electromagnetic radiation detector 31 essentially obtains the level and frequency of ambient electromagnetic radiation of the image forming apparatus 1. In this environment, there is at least one the electronic apparatus 30.

The processor 7 obtains electromagnetic radiation information 32 from the electronic apparatus 30 by the wireless communication device 13 shown in FIG. 1. The electromagnetic radiation information 32 is information related to electromagnetic radiation emitted by the electronic apparatus 30. The electromagnetic radiation information 32 includes the level and frequency of electromagnetic radiation emitted by the electronic apparatus 30 and the positional information of the electronic apparatus 30. The electromagnetic radiation information 32 may also include the allowable limit of electromagnetic radiation exposure of the electronic apparatus 30 and the process of the electronic apparatus 30. The level and frequency of electromagnetic radiation emitted by the electronic apparatus 30 and the allowable limit of electromagnetic radiation exposure of the electronic apparatus 30 are predetermined as characteristic values of the electronic apparatus 30.

The level of ambient electromagnetic radiation of the image forming apparatus 1 may not be obtained by the electromagnetic radiation detector 31. That is, it may be obtained by calculation using the level and frequency of electromagnetic radiation, the positional information, and other information included in the electromagnetic radiation information 32 obtained from the electronic apparatus 30.

Then the level of ambient electromagnetic radiation of the image forming apparatus 1 and the electromagnetic radiation information 32, which are obtained as described above, are stored on the memory 33. The level and frequency of electromagnetic radiation emitted by the image forming apparatus 1, the allowable limit of electromagnetic radiation exposure of the image forming apparatus 1, the positional information of the image forming apparatus 1, and the process of the image forming apparatus 1 are stored in advance on the memory 33.

The image forming apparatus 1 is further provided with multiple drivers each having a driving motor. The drivers have different levels and frequencies of electromagnetic radiation they emit and different allowable limits of electromagnetic radiation exposure; a level and frequency of electromagnetic radiation and an allowable limit of electromagnetic radiation exposure are thus stored on the memory 33 for each driver.

The processor 7 reads out of the memory 33 the level of ambient electromagnetic radiation of the image forming apparatus 1, and compares it to the allowable limit of electromagnetic radiation exposure of the image forming apparatus 1. Depending on the result of the comparison, the processor 7 controls operation of either one or both of the image forming apparatus 1 and the electronic apparatus 30. The allowable limit of electromagnetic radiation exposure is predetermined as a threshold and stored in advance on the memory 33. Alternatively, a value calculated with the allowable limit of electromagnetic radiation exposure may be predetermined as a threshold and stored in advance on the memory 33.

If the result of the comparison indicates that the level of ambient electromagnetic radiation of the image forming apparatus 1 can stop any of the motors improperly, for example, the processor 7 controls operation of either one or both of the image forming apparatus 1 and the electronic apparatus 30. The processor 7 controls operation of the electronic apparatus 30 by transmitting a control command 34 to the electronic apparatus 30. The processor 7 makes the electronic apparatus 30 stop operation, for example.

The image forming apparatus 1 controls its own operation, for example, copying, with reference to the level of ambient electromagnetic radiation of the image forming apparatus 1, as described below.

Copying is composed of multiple processes: automatic document feeding by the automatic document feeder 11, scanning by the scanner 10, printing, and other processes. These processes are assigned to the drivers each having a motor. In this example, the drivers (motors) have different allowable limits of electromagnetic radiation exposure and different assigned frequency ranges. An allowable limit of electromagnetic radiation exposure is predetermined as a threshold for each driver. This example will be further described with reference to FIGS. 4A, 4B and 4C.

Figure 4A:
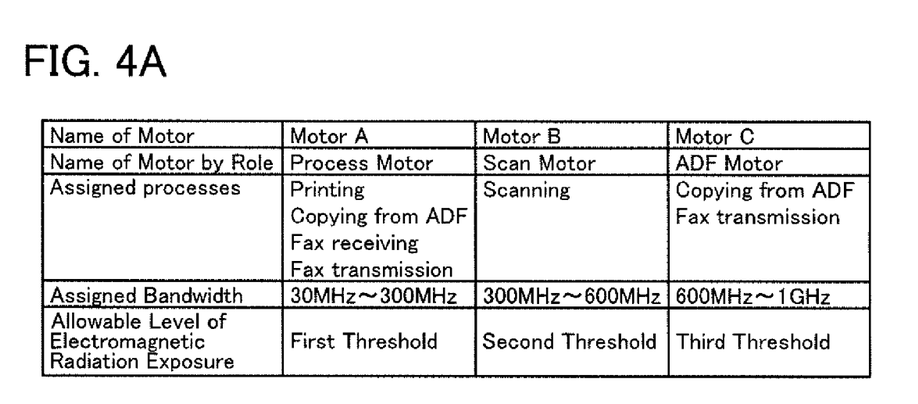
FIG. 4A is a lookup table containing combinations of: a driving motor of a driver; processes assigned to the driving motor; and an allowable limit (threshold) of electromagnetic radiation exposure of the driving motor.

FIG. 4A is a lookup table containing combinations of: a driving motor of a driver, processes assigned to the driving motor, and an allowable limit (threshold) of electromagnetic radiation exposure of the driving motor.

In this embodiment, there are three drivers and three motors. The motors A, B, and C are in charge of their assigned processes. Each motor has a threshold and an assigned frequency range. The motors A, B, and C can have malfunction if the level of ambient electromagnetic radiation exceeds their thresholds in their assigned frequency ranges. An operation is composed of multiple processes assigned to the motors A, B, and C. When any of the motors A, 8, and C has malfunction, the image forming apparatus 1 cannot perform an operation in part or in entirety.

The motor A is a process motor in charge of printing (copying or copying from ADF), fax receiving, fax transmission, and other operations; the assigned frequency range is 30 to 300 MHz and the allowable limit of electromagnetic radiation exposure is a first threshold.

The motor B is a scan motor in charge of document scanning by the scanner 10; the assigned frequency range is 300 to 600 MHz and the allowable limit of electromagnetic radiation exposure is a second threshold.

The motor C is an ADF motor for driving the automatic document feeder 11. It is in charge of printing from ADF and fax transmission from ADF; the assigned frequency range is 600 MHz to 1 GHz and the allowable limit of electromagnetic radiation exposure is a third threshold.

As described above, the first, second, and third threshold are predetermined and stored in advance on the memory 33.

It should be understood that the frequency ranges and the thresholds are examples and vary depending on the type of motor actually employed. The motors A, B, and C may be brushless DC motors, inner rotor brushless DC motors, and stepper motors with encoders, for example.

Figure 4B:
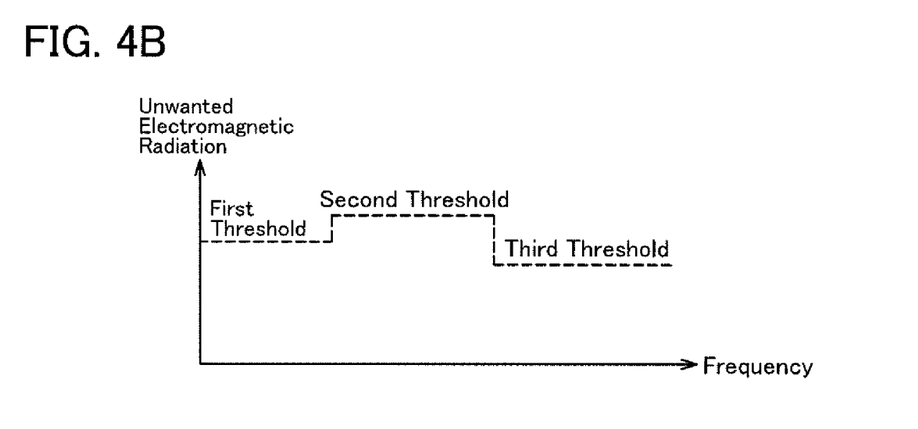
FIG. 4B is a graph for reference in describing relationships between a first, second, and third threshold.

FIG. 4B is a graph illustrating relationships between the first, second, and third threshold, with the vertical axis indicating unwanted electromagnetic radiation and the horizontal axis indicating frequency. In this example, the second threshold is the highest, the first threshold comes next, and the third threshold is the lowest.

Figure 4C:
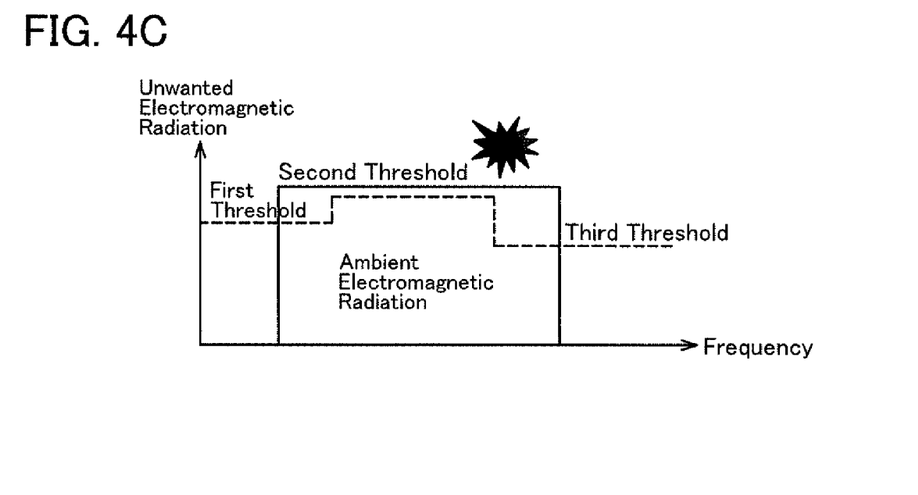
FIG. 4C is a graph for reference in describing relationships between the first, second, and third threshold along with the level of ambient electromagnetic radiation of the image forming apparatus.

FIG. 4C is a graph illustrating relationships between the first, second, and third threshold along with the level of ambient electromagnetic radiation of the image forming apparatus 1. Hereinafter, ambient electromagnetic radiation of the image forming apparatus 1 may also be referred to as "ambient electromagnetic radiation" for short. In the example of FIG. 4C, the level of ambient electromagnetic radiation exceeds all the thresholds: the first, second, and third thresholds. This means, it can cause malfunction to all the drivers having the motors A, B, and C necessary for copying. The black and spiky object in FIG. 4C indicates the presence of risk of malfunction. That same is true for FIG. 6 later to be referred to.

Figure 5:
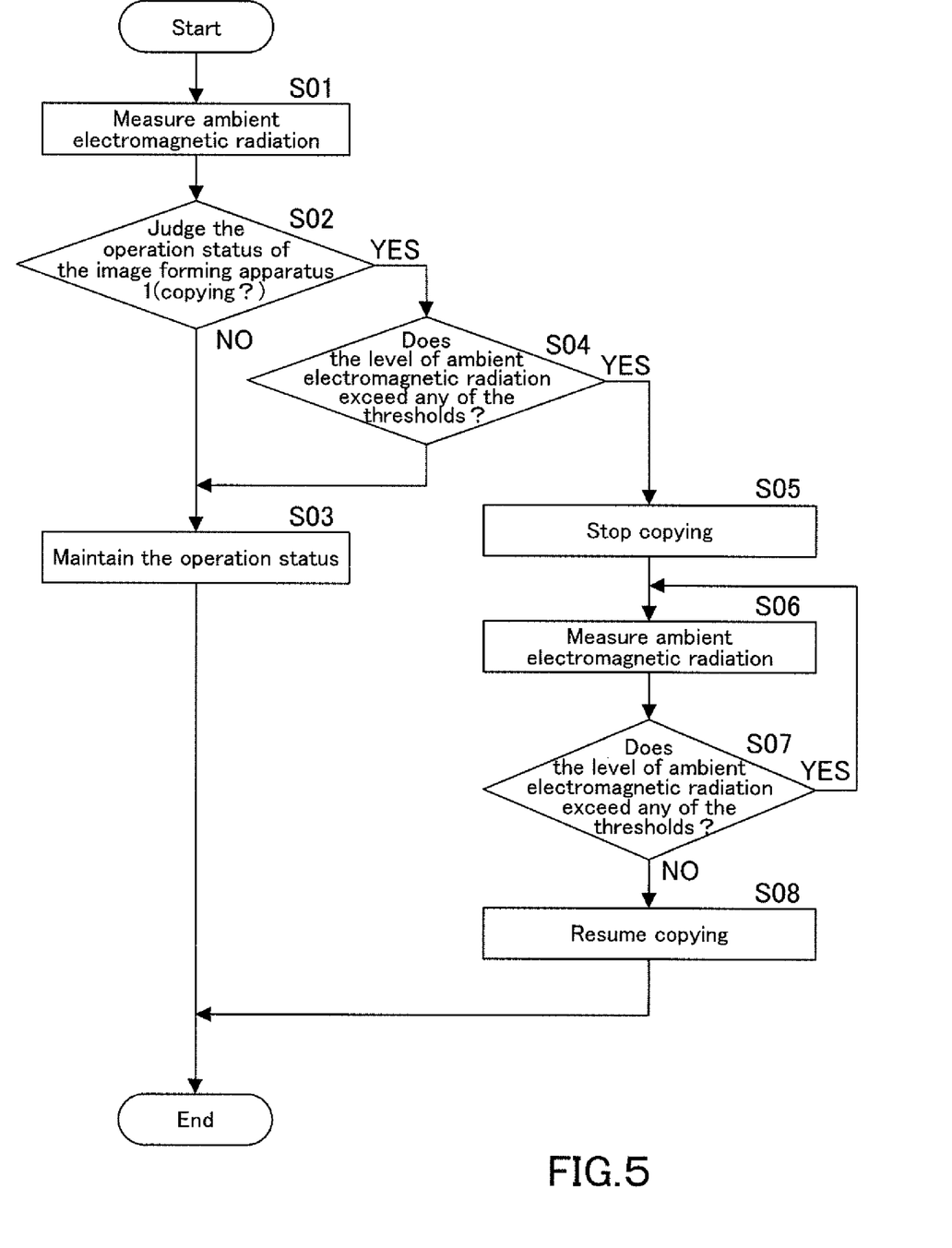
FIG. 5 is a flowchart representing an example of an operating procedure of the image forming apparatus, being aimed at reducing electromagnetic radiation exposure.

FIG. 5 is a flowchart representing an example of an operating procedure of the image forming apparatus 1, being aimed at reducing electromagnetic radiation exposure. The flowchart is executed by the CPU 71 of the processor 7 in accordance with an operation program stored on a recording medium such as the ROM 72. The same is true for the following flowcharts.

In Step S01, ambient electromagnetic radiation is measured by the electromagnetic radiation detector 31. The obtained values are stored on the memory 33. The timing for measuring ambient electromagnetic radiation is not limited. It may be measured before copying is started, immediately after copying is started, or while copying is in progress, for example.

In Step S02, the operation status of the image forming apparatus 1 (whether or not it indicates copying is in progress) is judged. If the operation status does not indicate copying is in progress (NO in Step S02), the operation status is maintained in Step S03.

If the operation status indicates copying is in progress (YES in Step S02), it is then judged in Step S04 whether or not the level of ambient electromagnetic radiation exceeds any of the first, second, and third threshold.

If it does not exceed any of the thresholds (NO in Step S04), copying is kept in progress in Step S03. If it exceeds any of the thresholds (YES in Step S04), copying is stopped in Step S05.

In Step S06, ambient electromagnetic radiation is measured again. In Step S07, the level of ambient electromagnetic radiation exceeds any of the thresholds. If it exceeds any of the thresholds (YES in Step S07), the routine returns to repeat Steps S06 and S07. If it does not exceed any of the thresholds (NO in Step S07), this means now the level of ambient electromagnetic radiation is harmless enough not to cause malfunction. So, copying is resumed in Step S08.

As described above, the information apparatus 1 obtains information related to the level of ambient electromagnetic radiation, and compares the level of ambient electromagnetic radiation to a threshold that is the allowable limit of electromagnetic radiation exposure, and then stops copying depending on the result of the comparison. That is, the image forming apparatus 1 is capable of preventing risk of malfunction and other problems due to ambient electromagnetic radiation, while not requiring a dedicated processor circuit for reducing electromagnetic radiation exposure or any intricate configuration.

Figure 6:
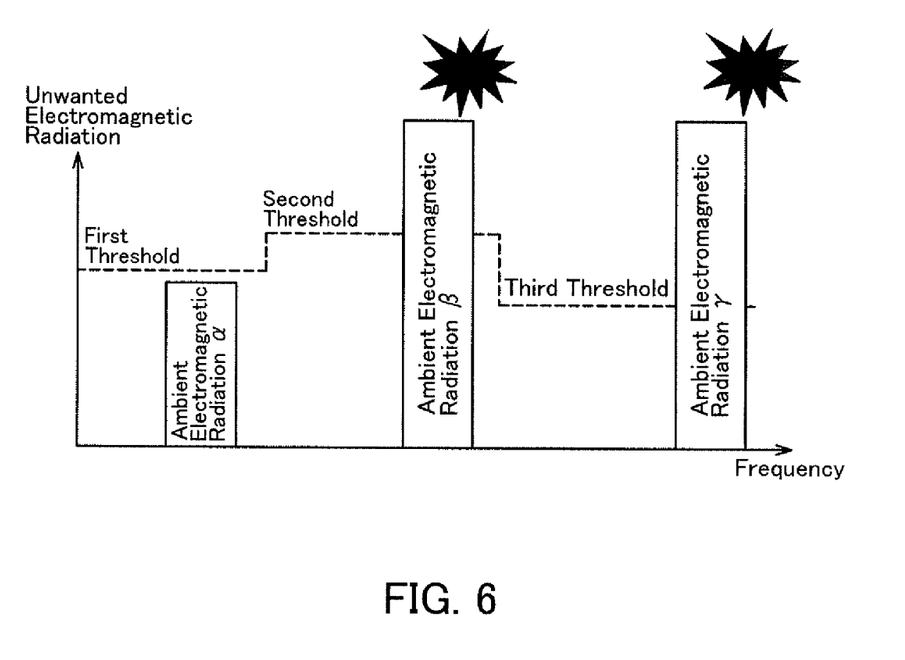
FIG. 6 is another graph for reference in describing relationships between the first, second, and third threshold along with the level of ambient electromagnetic radiation of the image forming apparatus.

In the example of FIG. 5, if the level of ambient electromagnetic radiation exceeds any of the first, second, and third threshold, copying is stopped. FIG. 6 is a graph for reference in describing another case, in which the level of ambient electromagnetic radiation reaches or goes under any of the thresholds. In the example of FIG. 6, the level of ambient electromagnetic radiation α, having a frequency within a frequency range assigned to the motor A, goes under the first threshold.

The level of ambient electromagnetic radiation β and the level of ambient electromagnetic radiation γ exceed the second and third threshold, respectively. In this case, the image forming apparatus 1 may stop the drivers (motors B and C) and keep the driver (motor A) running.

Figure 7:
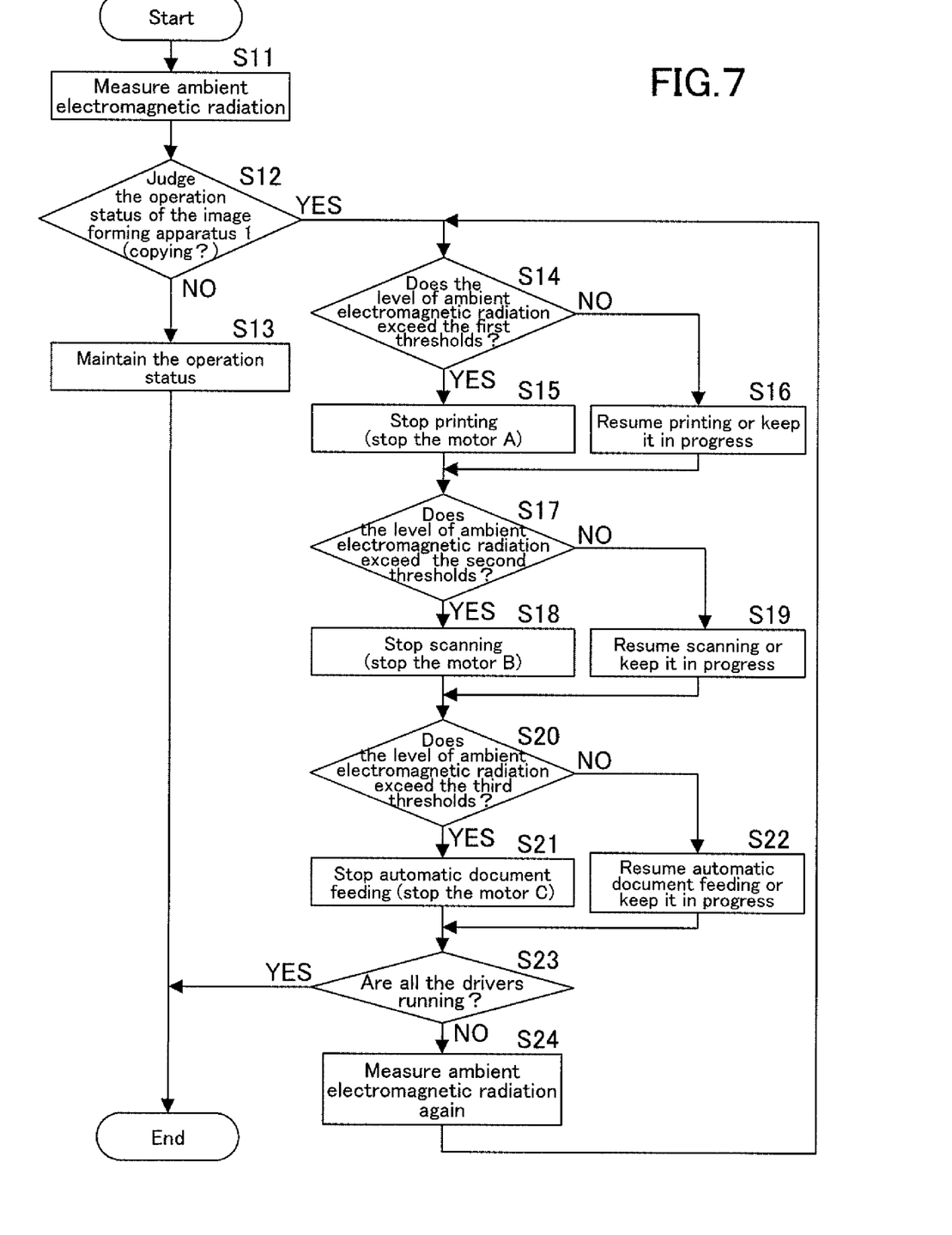
FIG. 7 is a flowchart representing an operating procedure of the image forming apparatus, being aimed at controlling each driver.

FIG. 7 is a flowchart representing an operating procedure of the image forming apparatus 1, being aimed at controlling each driver.

In Step S11, ambient electromagnetic radiation is measured by the electromagnetic radiation detector 31. The obtained values are stored on the memory 33.

In Step S12, the operation status of the image forming apparatus 1 (whether or not it indicates copying is in progress) is judged. If the operation status does not indicate copying is in progress (NO in Step S12), the operation status is maintained in Step S13.

If the operation status indicates copying is in progress (YES in Step S12), it is then judged in Step S14 whether or not the level of ambient electromagnetic radiation exceeds the first threshold. If it exceeds the first threshold (YES in Step S14), the motor A is stopped and printing is thus stopped in Step S15. The routine then proceeds to Step S17. If it does not exceed the first threshold (NO in Step S14), printing is kept in progress in Step S16. The routine then proceeds to Step S17.

In Step S17, it is judged whether or not the level of ambient electromagnetic radiation exceeds the second threshold. If it exceeds the second threshold (YES in Step S17), the motor B is stopped and scanning is thus stopped in Step S18. The routine then proceeds to Step S20. If it does not exceed the second threshold (NO in Step S17), scanning is kept in progress in Step S19. The routine then proceeds to Step S20.

In Step S20, it is judged whether or not the level of ambient electromagnetic radiation exceeds the third threshold. If it exceeds the third threshold (YES in Step S20), the motor C is stopped and automatic document feeding is thus stopped in Step S21. The routine then proceeds to Step S23. If it does not exceed the third threshold (NO in Step S20), automatic document feeding is kept in progress in Step S22. The routine then proceeds to Step S23.

In Step S23, it is judged whether or not all the drivers are running. If all the drivers are not running (NO in Step S23), ambient electromagnetic radiation is measured again in Step S24. The routine then returns to Step S14. If the level of ambient electromagnetic radiation does not exceed any of the thresholds (NO in Step S14, NO in Step S17, and NO in Step S20), printing, scanning, and automatic document feeding are all resumed (Steps S16, S19, S22).

If all the drivers are running (YES in Step S23), the routine terminates.

As described above, in the example of FIG. 7, the image forming apparatus 1 stops copying in part, not in entirety, thus can finish the entire copying more quickly.

The image forming apparatus 1 may be further configured to notify the user of stopped processes via the operation panel 6, an LED status indicator, or a printer driver.

In the example of FIG. 7, the image forming apparatus 1 performs copying. Alternatively, the image forming apparatus 1 may perform fax receiving or fax transmission.

Hereinafter, these cases will be described. Fax receiving is composed of fax data receiving and printing. If ambient electromagnetic radiation while fax data receiving is in progress is ambient electromagnetic radiation α shown in FIG. 6, printing (by the motor A) is affected. But fax data receiving is not affected. So, if the level of ambient electromagnetic radiation α shown in FIG. 6 exceeds the first threshold while fax data receiving is in progress, printing is put on hold and fax data receiving is kept in progress. While printing is on hold, ambient electromagnetic radiation is measured and compared to the first threshold at intervals. If the level of ambient electromagnetic radiation still exceeds the first threshold, printing is kept on hold; if it reaches or goes under the first threshold, printing is released.

Fax transmission is composed of fax data transmission and automatic document feeding. If ambient electromagnetic radiation while fax data transmission is in progress is ambient electromagnetic radiation γ shown in FIG. 6, automatic document feeding (by the motor C) is affected. But fax data transmission is not affected. So, if the level of ambient electromagnetic radiation γ shown in FIG. 6 exceeds the third threshold while fax data transmission is in progress, automatic document feeding is put on hold and fax data transmission is kept in progress. While automatic document feeding is on hold, ambient electromagnetic radiation is measured and compared to the third threshold at intervals. If the level of ambient electromagnetic radiation still exceeds the third threshold, automatic document feeding is kept on hold; if it reaches or goes under the third threshold, automatic document feeding is released.

In this example, the image forming apparatus 1 controls its own operation. The image forming apparatus 1 may further control operation of the electronic apparatus 30. Alternatively, the image forming apparatus 1 may control operation of the electronic apparatus 30, not its own operation.

Figure 8:
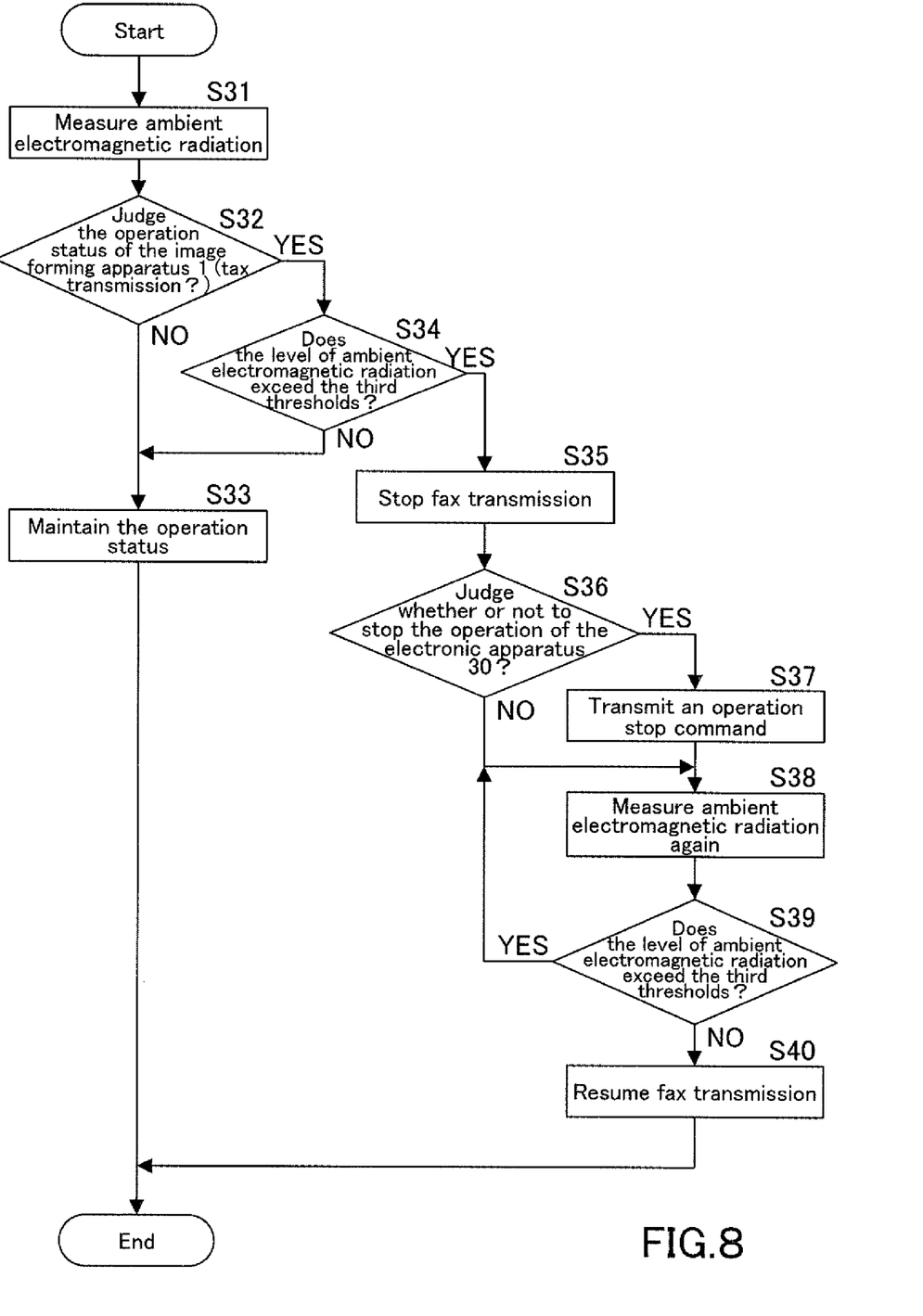
FIG. 8 is a flowchart representing an operating procedure of the image forming apparatus, being aimed at controlling operation of another electronic apparatus.

FIG. 8 is a flowchart representing an operating procedure of the image forming apparatus 1, being aimed at controlling operation of the electronic apparatus 30. In this example, the image forming apparatus perform fax transmission.

In Step S31, ambient electromagnetic radiation is measured by the electromagnetic radiation detector 31. The obtained values are stored on the memory 33.

In Step S32, the operation status of the image forming apparatus 1 (whether or not it indicates fax transmission is in progress) is judged. If the operation status does not indicate fax transmission is in progress (NO in Step S32), the operation status is maintained in Step S33.

If the operation status indicates fax transmission is in progress (YES in Step S32), it is then judged in Step S34 whether or not the level of ambient electromagnetic radiation exceeds the third threshold. If it does not exceed the third threshold (NO in Step S34), fax transmission is kept in progress in Step S33. If it exceeds the third threshold (YES in Step S34), fax transmission is stopped in Step S35.

In Step S36, it is judged whether or not to stop the operation of the electronic apparatus 30. This judgment is made with reference to the status of the image forming apparatus 1 and a priority given in advance to the image forming apparatus 1. Ambient electromagnetic radiation can cause a communication error while fax transmission or receiving is in progress. In this example, a high priority for tax transmission and receiving is assigned to the image forming apparatus 1. So, in Step S37, an operation stop command is transmitted to the electronic apparatus 30.

In Step S38, ambient electromagnetic radiation is measured again. In Step S39, the level of ambient electromagnetic radiation exceeds the third threshold. If it exceeds the third threshold (YES in Step S39), the routine returns to repeat Steps S38 and S39. If it does not exceed the third threshold (NO in Step S39), fax transmission is resumed in Step S40.

As described above, in this embodiment, if the level of ambient electromagnetic radiation exceeds the third threshold, the image forming apparatus 1 makes the electronic apparatus 30 stop operation. There may be more than one the electronic apparatus 30. In this case, if the level of ambient electromagnetic radiation exceeds the third threshold, the image forming apparatus 1 searches for any of the electronic apparatuses 30, emitting electromagnetic radiation having the same frequency as the ambient electromagnetic radiation with reference to the levels and frequencies of electromagnetic radiation they emit, positional information, and other information obtained from the electronic apparatuses 30. The image forming apparatus 1 then transmits an operation stop command to the relevant electronic apparatus 30. Alternatively, the image forming apparatus 1 may transmit an operation stop command to all the electronic apparatuses 30.

In the example of the FIG. 8 flowchart, the image forming apparatus 1 transmits an operation stop command if the level of ambient electromagnetic radiation exceeds the third threshold only. Alternatively, the image forming apparatus 1 may transmit an operation stop command if the level of ambient electromagnetic radiation exceeds the second threshold only.

In this example, the image forming apparatus 1 transmits an operation stop command to the electronic apparatus 30 while stopping fax transmission. Alternatively, the image forming apparatus 1 transmits an operation stop command to the electronic apparatus 30 while keeping fax transmission in progress.

Furthermore, in this example, the image forming apparatus 1 judges whether or not to stop the operation of the electronic apparatus 30 while fax transmission or receiving is in progress. Alternatively, this judgment may be made while copying is in progress. In this case, this judgment is made with reference to the priority assigned to the image forming apparatus 1 or the number of jobs in the queue, for example: the image forming apparatus 1 does not transmit an operation stop command to the electronic apparatus 30 if there are a few jobs in the queue, but transmits an operation stop command to the electronic apparatus 30 if there are many jobs in the queue.

Hereinafter, a method of measuring ambient electromagnetic radiation will be described. Ambient electromagnetic radiation can be measured using a cabinet frame and bundled cables in the image forming apparatus 1 as antennas.

Figure 9A:
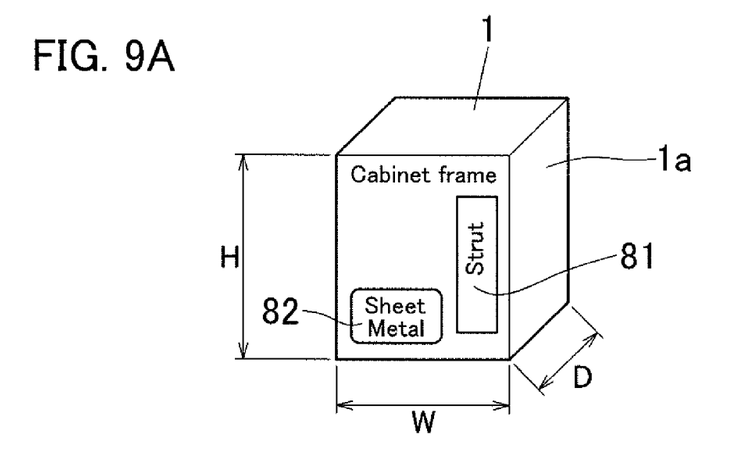
FIG. 9A illustrates a cabinet of the image forming apparatus, being composed of a strut, sheet metal, a frame, and other members.
Figure 9B:
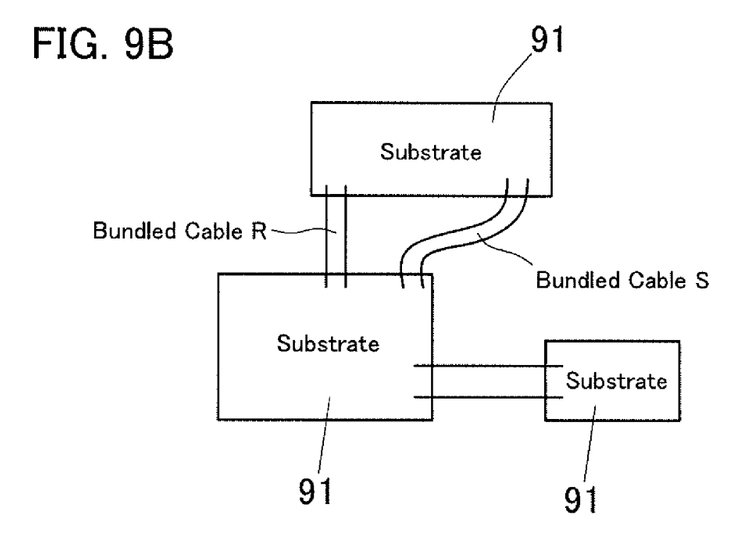
FIG. 9B illustrates bundled cables connecting substrates.

The image forming apparatus 1 has many metallic members inside. FIG. 9A illustrates a cabinet 1a having a width W, a depth D, and a height H, being composed of a strut 81, sheet metal 82, a frame, and other members. FIG. 9B illustrates bundled cables R, S, and other bundled cables all connecting substrates 91. Ambient electromagnetic radiation can be measured using the above-mentioned members as antennas. The measurement is performed by detecting and amplifying high-frequency currents in the sheet metal 82 and the bundled cables R and S.

Figure 10A:
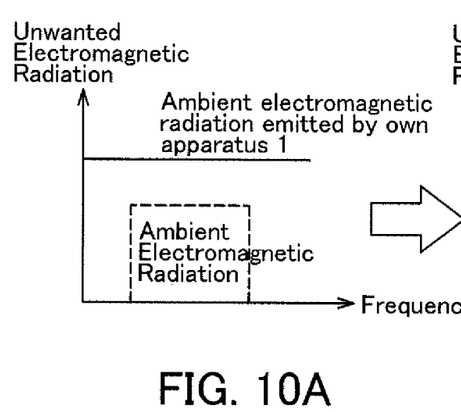
FIGS. 10A and 10B are graphs for reference in describing electromagnetic radiation emitted by the image forming apparatus can affect antenna characteristics of the image forming apparatus.
Figure 10B:
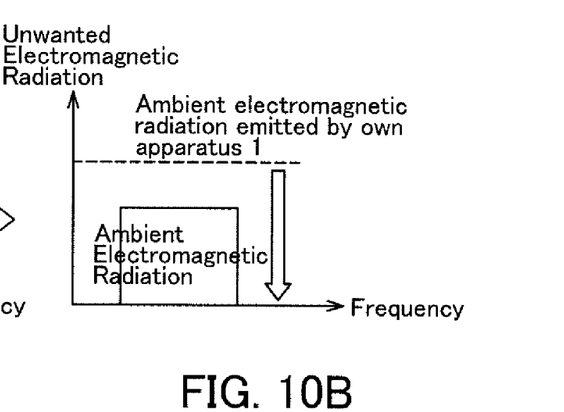

The image forming apparatus 1 has a function of measuring antenna characteristics of the image forming apparatus 1 itself. That is, the image forming apparatus 1 is allowed to measure ambient electromagnetic radiation using its frame cabinet and bundled cables as antennas. The image forming apparatus 1 must operate with a minimal load during the measurement of antenna characteristics, for the following reason. Operating with a large load, the image forming apparatus 1 will emit a high level of electromagnetic radiation, as illustrated in FIG. 10A, significantly affecting its antenna characteristics. Operating with a minimal load, the image forming apparatus 1 will emit an extremely low level of electromagnetic radiation, as illustrated in FIG. 10B, only slightly affecting its antenna characteristics or the level of ambient electromagnetic radiation.

Figure 11:
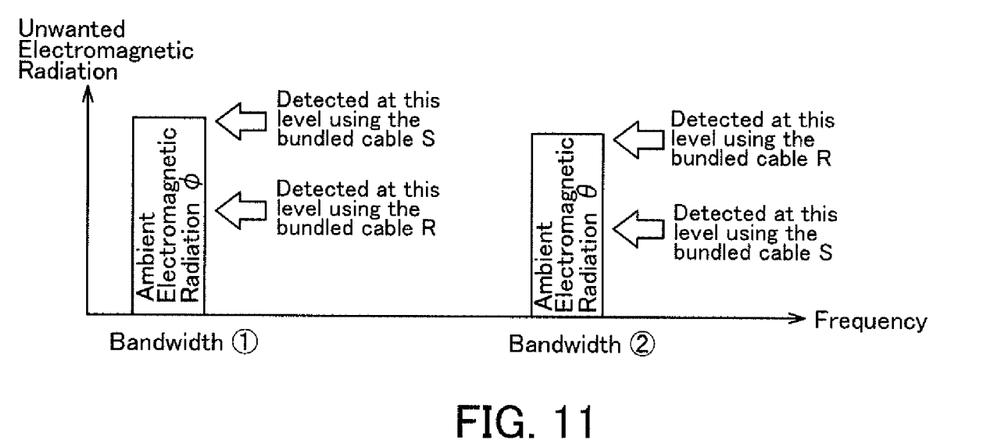
FIG. 11 illustrates the sensitivities of bundled cables R and S to reference electromagnetic radiations Φ and θ.

Electromagnetic radiation emitted by the electronic apparatus 30 causes electric current in the cabinet frame 1a and the bundled cables R and S of the image forming apparatus 1. For later use, the image forming apparatus 1 measures antenna characteristics of the cabinet frame 1a and the bundled cables R and S by calculation using the frequencies of currents in them. The cabinet frame 1a and the bundled cables R and S have different antenna characteristics because of their length, material, orientation, and other conditions. With respect to the reference antenna characteristics stored in advance, the image forming apparatus 1 will measure antenna characteristics of these members with a high degree of accuracy. FIG. 11 illustrates the sensitivities of the bundled cables R and S to electromagnetic radiations Φ and θ. The bundled cable S has a higher sensitivity than the bundled cable R to the electromagnetic radiation Φ, teaching that electromagnetic radiation having a frequency within a frequency range of the circled number 1 can be better detected using the bundled cable S. The bundled cable R has a higher sensitivity than the bundled cable S to the electromagnetic radiation θ, teaching that electromagnetic radiation having a frequency within a frequency range with the circled number 2 can be better detected using the bundled cable R.

Before the measurement of antenna characteristic, the image forming apparatus 1 performs communication with the electronic apparatus 30 to make it operate with a predetermined load. Operating with a predetermined load, the electronic apparatus 30 will constantly emit its proper level of electromagnetic radiation, achieving a high accuracy in the measurement of ambient electromagnetic radiation. In this embodiment, the image forming apparatus 1 performs wireless communication with the electronic apparatus 30 by the wireless communication device 13. The image forming apparatus 1 performs wireless communication via common technology such as a wireless LAN or BLUETOOTH. Alternatively, the image forming apparatus 1 may perform wireless communication using another wireless communication method.

The image forming apparatus 1 must operate with a minimal load during the measurement of ambient electromagnetic radiation. Operating with a minimal load, the image forming apparatus 1 will emit an extremely low level of electromagnetic radiation, only slightly affecting the level of ambient electromagnetic radiation.

As described above, the image forming apparatus 1 is capable of obtaining the level of ambient electromagnetic radiation by measurement, or by calculation using information related to electromagnetic radiation emitted by the electronic apparatus 30. This is advantageous when the image forming apparatus 1 is unable to measure antenna characteristics because of a mechanical problem or an environmental problem such as extremely high-power ambient electromagnetic radiation.

Figure 12:
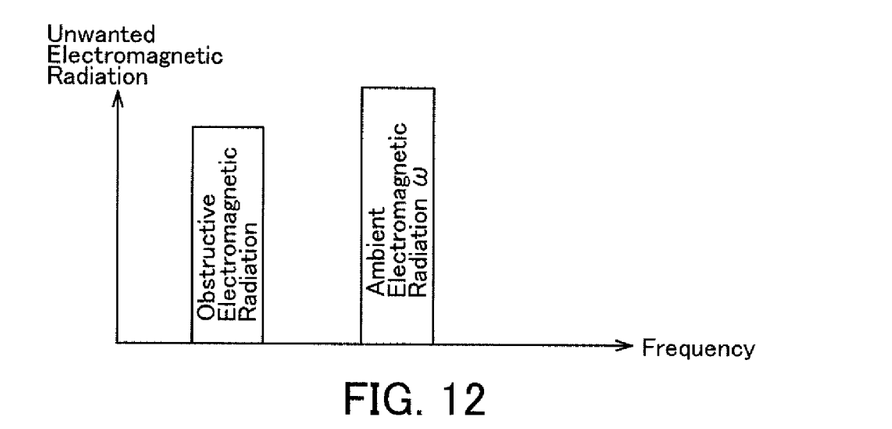
FIG. 12 is a graph for reference in describing that the level of ambient electromagnetic radiation can be obtained by calculation.

In this embodiment, the information related to electromagnetic radiation emitted by the electronic apparatus 30 is information including the level and frequency of electromagnetic radiation emitted by the electronic apparatus 30, the positional information of the electronic apparatus 30, and the process of the electronic apparatus 30. Obtaining the information related to electromagnetic radiation emitted by the electronic apparatus 30, the image forming apparatus 1 calculates the level of ambient electromagnetic radiation w as indicated in FIG. 12. In case of any updates to the information related to electromagnetic radiation emitted by the electronic apparatus 30, the image forming apparatus 1 obtains it again to use for calculation.

While one embodiment of the present invention has been described in detail herein, it should be understood that the present invention is not limited to these embodiments. For example, controlling operation is stopping operation in the above-described embodiment. Alternatively, it may be any action less affecting the level of ambient electromagnetic radiation.

Furthermore, the image forming apparatus 1 represents an electronic apparatus in the above-described embodiment. Alternatively, a personal computer or any other kind of electronic apparatus having risk of malfunction due to ambient electromagnetic radiation may represent an electronic apparatus.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An electronic apparatus comprising a processor that performs:
    obtaining first information related to ambient electromagnetic radiation of the electronic apparatus in an environment having at least one other electronic apparatus; and
    controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained by the processor.

2. The electronic apparatus according to claim 1, wherein the processor further obtains second information from the at least one other electronic apparatus, the second information being related to electromagnetic radiation emitted by the at least one other electronic apparatus.

3. The electronic apparatus according to claim 2, wherein the processor obtains the first information by calculation using the second information received from the at least one other electronic apparatus.

4. The electronic apparatus according to claim 3, wherein the second information essentially includes a level and frequency of electromagnetic radiation emitted by the at least one other electronic apparatuses and positional information of the at least one other electronic apparatuses.

5. The electronic apparatus according to claim 2, wherein, in case of any updates to the second information, the processor again obtains the second information from the at least one other apparatus.

6. The electronic apparatus according to claim 1, being represented by an image forming apparatus.

7. The electronic apparatus according to claim 1, further comprising a driver being subject to malfunction due to electromagnetic radiation, wherein:
the allowable limit of electromagnetic radiation exposure of the electronic apparatus is the same of the driver; and
the processor controls operation of the electronic apparatus by stopping the driver.

8. The electronic apparatus according to claim 7, further comprising at least one other driver being subject to malfunction due to electromagnetic radiation, wherein:
an allowable limit of electromagnetic radiation exposure is predetermined for each driver; and
the processor selects one of the drivers to stop.

9. The electronic apparatus according to claim 1, further comprising multiple processes, wherein the processor displays any of the processes on a display, as a target to control.

10. The electronic apparatus according to claim 1, further comprising a copier function, wherein:
when the processor obtains the first information, the processor judges whether or not copying is in progress;
if copying is in progress, the processor further judges whether or not the level of ambient electromagnetic radiation exceeds the allowable limit of electromagnetic radiation exposure of any driver necessary for copying, in a frequency range assigned to the any driver, the level of ambient electromagnetic radiation being included in the first information obtained by the processor;
if it exceeds the allowable limit of electromagnetic radiation exposure of any driver necessary for copying, the processor stops copying; and
if it reaches or goes under the allowable limits of electromagnetic radiation exposure of all drivers necessary for copying, the processor resumes copying.

11. The electronic apparatus according to claim 1, further comprising a copier function, wherein:
when the processor obtains the first information, the processor judges whether or not copying is in progress;
if copying is in progress, the processor further judges whether or not the level of ambient electromagnetic radiation exceeds the allowable limit of electromagnetic radiation exposure of any driver necessary for copying, in a frequency range assigned to the any driver, the level of ambient electromagnetic radiation being included in the first information obtained by the processor;
if it exceeds the allowable limit of electromagnetic radiation exposure of any driver necessary for copying, the processor stops the any driver; and
if it reaches or goes under the allowable limit of electromagnetic radiation exposure of the any driver, the processor restart the any driver.

12. The electronic apparatus according to claim 11, wherein the processor stops printing by stopping the any driver.

13. The electronic apparatus according to claim 11, wherein the processor stops scanning by stopping the any driver.

14. The electronic apparatus according to claim 11, wherein the processor stops automatic document feeding by stopping the any driver.

15. The electronic apparatus according to claim 1, further comprising a facsimile receiving function, wherein:
when the processor obtains the first information, the processor judges whether or not facsimile receiving is in progress;
if facsimile receiving is in progress, the processor further judges whether or not the level of ambient electromagnetic radiation exceeds the allowable limits of electromagnetic radiation exposure, in a frequency range assigned to facsimile receiving, the level of ambient electromagnetic radiation being included in the first information obtained by the processor;
if it exceeds the allowable limit of electromagnetic radiation exposure, the processor stops facsimile receiving; and
if it reaches or goes under the allowable limits of electromagnetic radiation exposure, the processor resumes facsimile receiving.

16. The electronic apparatus according to claim 1, further comprising a facsimile transmission function, wherein:
when the processor obtains the first information, the processor judges whether or not facsimile transmission is in progress;
if facsimile transmission is in progress, the processor further judges whether or not the level of ambient electromagnetic radiation exceeds the allowable limits of electromagnetic radiation exposure, in a frequency range assigned to facsimile transmission, the level of ambient electromagnetic radiation being included in the first information obtained by the processor;
if it exceeds the allowable limit of electromagnetic radiation exposure, the processor stops facsimile transmission; and
if it reaches or goes under the allowable limit of electromagnetic radiation exposure, the processor resumes facsimile transmission.

17. The electronic apparatus according to claim 1, wherein, before controlling operation of either one or both of the electronic apparatus and the at least one other electronic apparatuses, the processor judges whether or not to transmit an operation stop command to the at least one other electronic apparatus with reference to the status of the electronic apparatus and a priority assigned to the electronic apparatus.

18. The electronic apparatus according to claim 1, wherein:
the processor makes the electronic apparatus stop operation while transmitting an operation stop command to the at least one other electronic apparatus; and
if the level of ambient electromagnetic radiation of the electronic apparatus reaches or goes under the allowable limit of electromagnetic radiation exposure of the electronic apparatus, the processor makes the electronic apparatus resume operation.

19. The electronic apparatus according to claim 1, wherein:
the processor obtains the first information by measurement; and
the processor measures the first information using, as antennas, either one or both of a cabinet frame and bundled cable of the electronic apparatus.

20. The electronic apparatus according to claim 19, further comprising a measurement function for measuring antenna characteristics of either one or both of the cabinet frame and bundled cable of the electronic apparatus, wherein;

the processor makes the electronic apparatus operate with a minimal load while measurement is in progress; and the processor measures the first information by measuring antenna characteristics of the either one or both on the basis of the frequencies of currents in the either one or both, the currents being caused by electromagnetic radiation emitted by the at least one other electronic apparatus.

21. The electronic apparatus according to claim 20, wherein the processor starts communication to the at least one other electronic apparatus before measurement, and makes the at least one other electronic apparatus operate with a predetermined load while measurement is in progress.

22. The electronic apparatus according to claim 19, wherein the processor obtains the first information by measurement while the electronic apparatus is operating with a minimal load.

23. The electronic apparatus according to claim 1, further comprising a communication device allowing the electronic apparatus to perform communication with the at least one other electronic apparatuses.

24. An image forming apparatus comprising a processor that performs:

obtaining first information related to ambient electromagnetic radiation of the electronic apparatus in an environment having at least one other electronic apparatus; and controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained by the processor.

25. A non-transitory computer-readable recording medium storing a program for a computer of an electronic apparatus, the program to make the computer execute:

obtaining first information related to ambient electromagnetic radiation of the electronic apparatus being in an environment having at least one other electronic apparatus; and controlling operation of either one or both of the electronic apparatus and the at least one other electronic apparatus with reference to the result of the comparison of a level of ambient electromagnetic radiation of the electronic apparatus to an allowable limit of electromagnetic radiation exposure of the electronic apparatus, the level of ambient electromagnetic radiation being included in the first information obtained.

* * * * *